(12) United States Patent
Leblang et al.

(10) Patent No.: US 10,715,528 B1
(45) Date of Patent: *Jul. 14, 2020

(54) MULTI-FACTOR LOCATION-BASED AND VOICE-BASED USER LOCATION AUTHENTICATION

(71) Applicant: Amazon Technologies, Inc., Seattle, WA (US)

(72) Inventors: Jonathan Alan Leblang, Menlo Park, CA (US); Dick Clarence Hardt, Seattle, WA (US); Aaron Gowatch, San Francisco, CA (US); Yu-Hsiang Cheng, Bothell, WA (US); Kevin Crews, Seattle, WA (US); Nicolas Cyril Guillaume, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

This patent is subject to a terminal disclaimer.

(21) Appl. No.: 15/885,061

(22) Filed: Jan. 31, 2018

(51) Int. Cl.
*H04L 29/06* (2006.01)
*H04W 4/02* (2018.01)
*G10L 15/22* (2006.01)
*G06K 9/00* (2006.01)
*G10L 17/00* (2013.01)
*H04L 29/08* (2006.01)

(52) U.S. Cl.
CPC ........ *H04L 63/102* (2013.01); *G06K 9/00268* (2013.01); *G10L 15/22* (2013.01); *G10L 17/005* (2013.01); *H04L 63/0861* (2013.01); *H04W 4/02* (2013.01); *G10L 2015/223* (2013.01); *H04L 67/18* (2013.01); *H04L 2463/082* (2013.01)

(58) Field of Classification Search
CPC . H04L 63/102; H04L 65/18; H04L 2463/062; H04W 4/02; G06K 9/00268; G10L 2015/223; G10L 15/22; G01L 17/005
See application file for complete search history.

(56) References Cited

U.S. PATENT DOCUMENTS

| | | | | |
|---|---|---|---|---|
| 6,005,939 | A * | 12/1999 | Fortenberry | G06Q 20/0855 380/30 |
| 9,911,290 | B1 * | 3/2018 | Zalewski | G06Q 20/12 |
| 10,103,762 | B1 | 10/2018 | Bullington | |
| 2011/0028160 | A1 * | 2/2011 | Roeding | G06Q 30/0214 455/456.1 |
| 2013/0038673 | A1 | 2/2013 | Hiller | |
| 2014/0108084 | A1 | 4/2014 | Bargetzi | |
| 2015/0110259 | A1 | 4/2015 | Kaye | |
| 2015/0142895 | A1 | 5/2015 | Beran | |
| 2016/0029148 | A1 * | 1/2016 | Jackson | H04W 4/80 455/41.2 |

(Continued)

*Primary Examiner* — Alexander Lagor
*Assistant Examiner* — William B Jones
(74) *Attorney, Agent, or Firm* — Knobbe, Martens, Olson & Bear, LLP

(57) ABSTRACT

A system is provided that determines a location of a user based on various criteria. The system may detect the location of a user based on the location of the user's voice and the location of the user's device, as determined using a beacon signal. The system may process data representing the user's voice and device locations using a model to determine a confidence that a user is at a particular location. Based on the determined location, the system may perform various actions.

20 Claims, 8 Drawing Sheets

(56) References Cited

U.S. PATENT DOCUMENTS

| | | |
|---|---|---|
| 2016/0148164 A1 | 5/2016 | Luk |
| 2017/0124526 A1 | 5/2017 | Sanderford |
| 2017/0308866 A1 | 10/2017 | Dotan-Cohen |
| 2017/0357917 A1 | 12/2017 | Holmes |
| 2018/0107987 A1 | 4/2018 | MacKenzie |
| 2018/0109533 A1* | 4/2018 | Thubert ................ H04L 41/28 |
| 2019/0180248 A1 | 6/2019 | Byun |

* cited by examiner

MULTI-FACTOR LOCATION-BASED AND VOICE-BASED USER LOCATION AUTHENTICATION

BACKGROUND

Computing devices, including voice-enabled devices, are used for a variety of purposes. Consumers may speak voice commands to the devices to cause the devices to perform various tasks. For example, some tasks may include setting reminders, setting alarms, searching the internet, calling or texting a contact, communicating with wireless connected products (for example, internet of things), and many others. The devices are typically associated with one or more user accounts.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
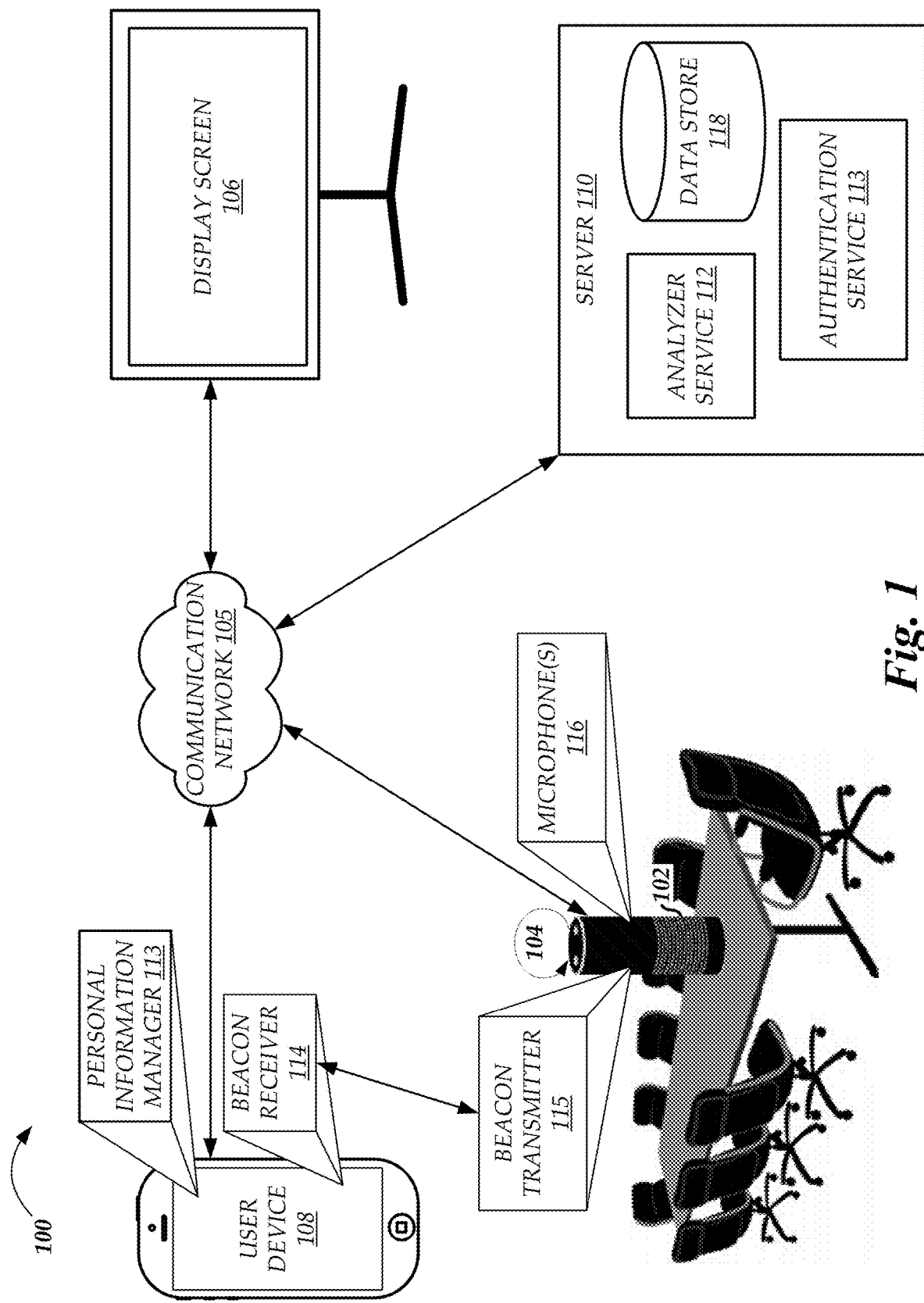
FIG. 1 is an illustration of a computing environment including a server, a user device, a screen, and a communication device, according to some embodiments.

The present disclosure is directed to a system that uses device-based location data in combination with voice data, schedule data, and/or various other data to determine user locations, authenticate users, and/or perform various user-presence-related actions. The system may detect the location of a user based on the location of the user's voice (e.g., through the application of a voice model), the location of the user's device (e.g., a cell phone, tablet, laptop, computer, or others), and/or the expected location of a user (e.g., through analyzing meeting invitations or other schedule information). In one embodiment, the system may use a machine-learning-based model to process input data regarding multiple locations detected for a user (e.g., voice location, device location, scheduled location, etc.). The model may generate data regarding a likely location of a user, or a confidence level that the user is in a particular location. In some embodiments, the system may consider other data, such as data regarding facial recognition, data regarding locations of other user devices, etc. Based on the determined locations and/or confidence scores, the system may execute various actions.

Shared communication devices, such as audio and/or visual conferencing systems, may be used a variety of settings. In an enterprise setting, users may use shared communication devices in their offices, meeting rooms, and the like. However, at least some of the shared communication devices do not provide certain features that may be desirable in certain settings. For example, conventional conference systems (e.g., conference systems implemented in the workplace) do not properly authenticate users using location-based criteria. In addition, connecting a shared communication device to a secure server and allowing any person to walk by and interact with the shared communication device may pose a security risk. The systems and methods disclosed herein provide solutions to, among other things, the authentication issues that can arise in shared communication devices. In some embodiments, a system implements multi-factor location-based user authentication procedures that either remove or mitigate the risk associated with implementing shared communication devices. For example, a user may wish to gain access to secure data by using a recording of another user's voice. The system has protections in place to prevent such unauthorized access, such as the ability to verify or authenticate users' locations to a particular degree of certainty, thereby allowing secure information to be protected from unauthorized access.

Some aspects of the present disclosure relate to analyzing a user voice location with respect to a user device location. Based on the analysis, a system can determine a confidence level associated with an actual location of a user. For example, the system may detect User 1's device in Location A and User 1's voice near Location A. In this scenario, the system may authenticate User 1 with a high degree of confidence based on the matching location data within a specific margin of error or threshold. In another example, the system may detect User 2's device in Location A and User 2's voice in Location B, far from Location A. In this second scenario, the system may flag an inconsistent location determination and take certain actions in response (e.g., restrict User 2's access to any secure data or features temporarily, permanently, or until the issue is resolved; prompt User 2 for additional authentication information; etc.). For the situation where User 2 may have forgotten her device at home or in another room far from Location A, the system may use additional or alternative criteria to determine a confidence in User 2's location.

Additional aspects of the present disclosure relate to analyzing data regarding a detected current user location (by the method described above, for example) with respect to data regarding an expected location (e.g., calendar data regarding a scheduled meeting). Based on the analysis, the system can determine a confidence level related to a user's actual current location. For example, the system may compare a list of confirmed attendees or invitees to a meeting with data representing a user or user device interacting with a communication device. If the user was not on the list of attendees or invitees, the system may not authenticate the user. In some embodiments, authentication of a user's location may enable the user access to information, the ability to remain present during a meeting, or invoke additional functions or services provided by the communication device (for example, printing may be blocked for certain users).

Although aspects of some embodiments described in the disclosure will focus, for the purpose of illustration, on particular examples of multiple factor user presence authentication, examples are illustrative only and are not intended to be limiting. In some embodiments, the systems and techniques described herein may be applied to other types of multiple factor authentication. Various aspects of the disclosure will now be described with regard to certain examples and embodiments, which are intended to illustrate but not limit the disclosure.

Also, it should be appreciated that any of the processes described herein may begin in response to an event, manually, or automatically. When the process is initiated, a set of executable program instructions stored on one or more non-transitory computer-readable media (e.g., hard drive, flash memory, removable media, etc.) may be loaded into memory (e.g., random access memory or "RAM") of a computing device, such as a server or communication device (or both). The executable instructions may then be executed by a hardware based computer processor (e.g., a central processing unit or "CPU") of the computing device. In some embodiments, the process or portions thereof may be implemented on multiple processors, serially or in parallel. In some embodiments, the computing device may be similar to the computing device 700 shown in FIG. 7.

Turning to FIG. 1, a computing environment 100 is shown including a server 110, a user device 108, a communication device 102, and a display screen 106, according to some embodiments. The server 110, user device 108, display screen 106, and communication device 102 may communicate with each other via one or more communication networks 105. A communication network 105 may be a publicly accessible network of linked networks, possibly operated by various distinct parties, such as the internet. In other embodiments, the network 106 may include a private network, personal area network, local area network, wide area network, cable network, satellite network, cellular telephone network, etc. or a combination thereof, some or all of which may or may not have access to and/or from the internet.

The server 110 may include various components for providing the features described herein. Illustratively, the server 110 may include a cache (not shown) for caching information received from a data server and an analyzer service 112 for analyzing location data, authentication criteria, and security protocols pertaining to stored data. The server 110 may also include a data store 118 for storing voice model data, meeting data, user data, authentication criteria, user access restrictions and controls, for example. Also, in some embodiments, the data store 118 may be or include a key-value data store, such as a "noSQL" database, object-based database, or dictionary. The server 110 may also include an authentication service 117 used to confirm within a degree of confidence that a particular user is who he or she says, or that the user is in a particular location. The authentication service 117 may calculate or analyze a confidence score, which may be based on a set of inputs provided to the server 110 and, in some embodiments, an analysis of data stored in the data store 118. The authentication service 117 is described in more detail below, and may be the same as the authentication manager 210 in FIG. 2. The components of the server 110 shown in FIG. 1 and described herein are illustrative only, and are not intended to be limiting. In some embodiments, fewer, additional, and/or alternative components may be implemented by the server 110. The server 110 is also discussed in more detail herein.

The user device 108 may include various components for providing the features described herein. For example, the user device 108 may include a beacon receiver 114. The beacon receiver 114 may communicate with the beacon transmitter 115 in the communication device 102, or another beacon transmitter 115. The beacon transmitter 115 may transmit (or passively provide) a signal, such as a beacon signal that includes location data associated with the beacon transmitter 115. The beacon receiver 114 can then use the location data to determine the location of the user device 108, or the beacon receiver 114 may send (or cause the user device 108 to send) the location data to the server 110 (or some other system) to inform the server 110 of the location of user device 108. More details on the beacon receiver 114 and beacon transmitter 115 are described below.

In some embodiments, the user device 108 may also include a personal information manager 113 that manages data regarding a calendar or meeting events. A user of the user device 108 may interact with and modify meeting events or a calendar through the personal information manager 113. The calendar may synchronize with the communication device 102 or server 110 so that the communication device 102 can begin pre-meeting procedures, as described in FIGS. 3-4. In some embodiments, the personal information manager 113 may synchronize with or otherwise save data to a third-party server or other system that is directly accessible by the communication device 102 or server 110 (e.g., without going through the user device 108). In some embodiments, there may be multiple calendars available to a user, for example, the user's personal calendar, user's work calendar, other user's shared calendars, and room calendars associated with one or more communication devices 102. In some embodiments, the room calendars are schedules of meetings occurring in a particular location (e.g., room, building, geographic location, etc.) with designated equipment. Such equipment may be a communication device 102, a display screen 106, or any other meeting room equipment. The components of the electronic user device 108 shown in FIG. 1 and described herein are illustrative only, and are not intended to be limiting. In some embodiments, fewer, additional, and/or alternative components may be implemented by the user device 108.

The communication device 102 may include various components for providing the features described herein. Illustratively, the communication device 102 may include a data store (not shown) for storing information regarding any upcoming meeting or event, or any information particular to the location or use of the communication device 102. For example, the communication device 102 may store voice model data for attendees of an upcoming meeting taking place in the same vicinity of the communication device 102. In some embodiments, the communication device 102 may load or be provided with the voice model data based on meeting data analyzed by the communication device 102 or server 110, and/or based on location data representing the location of various user devices 108. Also, for example, the communication device 102 may include a beacon transmitter 115. The beacon transmitter 115 may generate beacon signals detectible by the beacon receiver 114 in the user device 108. In some embodiments, the communication device 102 may include multiple beacon transmitters 115 (e.g., a separate beacon transmitter for each of multiple communication protocols). In some embodiments, a beacon transmitter 115 may be physically separate from the communication device 102, and may or may not communicate with the communication device 102 and/or server 110. More details on the beacon receiver 114 and beacon transmitter 115 are described below.

The communication device 102 may also include or be in communication with a microphone to detect utterances, such as voice commands, from one or more users. In some embodiments, the communication device 102 may include or be in communication with multiple microphones, for example for noise cancelling or spatial analysis of an audio source to determine an approximate location of the audio source. The components of the communication device 102 shown in FIG. 1 and described herein are illustrative only, and are not intended to be limiting. In some embodiments, fewer, additional, and/or alternative components may be implemented by the communication device 102. In some embodiments, the server 110 (or portions thereof) may be physically implemented on the same device as the communication device 102 (or portions thereof). Also, in some embodiments, analysis of data 104 may occur within the communication device 102. For example, certain voice models may be downloaded onto the communication device 102 prior to a meeting (for example, the communication device 102 may download all voice models for each confirmed meeting participant based on meeting data associated with the meeting). It can be advantageous for the communication device 102 to download various data prior to a meeting (if the data is not otherwise stored on the communication device 102) in case a network or internet connection is not functioning during the meeting.

In some embodiments, much or all of the analysis and data may not be performed by or stored on the communication device 102, but instead may be performed by and/or stored on the server 110. This configuration can free resources on the communication device 102 to process audio commands more quickly, lower the cost of production of the communication device 102, and to maintain data and rules on a centralized server 110 to keep the data secure, up-to-date, and consistent across all platforms. In some embodiments, the communication device 102 may be configured to perform any, all, or some combination of the features described herein with respect to the server 110. For example, the communication device 102 may perform voice processing, beacon signal processing, score generation, other features described herein with respect to the server 110, some combination thereof, etc. The communication device 102 may implement some or all of the features instead of, or in addition to, the server 110 implementing the features. In some embodiments, there may not be a server 110.

The display screen 106 may provide the ability to display content on a screen (for example, a television, monitor, or projector). In some embodiments, content may include media such as presentations (slideshows or spreadsheets, for example), video, an internet browser, various files on a local or network storage, files in the cloud, files in the server 110, files on a user device (user device 108, for example), or other media useful for the meeting. In some embodiments, the server 110 or communication device 102 may prepare the display screen 106 based on any meeting data associated with a meeting event scheduled for the location of the communication device 102 and/or display screen 106. For example, if a presentation is going to be shown during a scheduled meeting occurring in the same room as the communication device 102 and display screen 106, the display screen 106 may be prepared to show the presentation when the meeting starts. In some embodiments, the presentation may not be shown unless all current attendees of the meeting are authenticated, all meeting invitees are present in the meeting, and/or all current attendees (or some subset thereof) are authorized to view the contents of the presentation. In some embodiments, content to be presented may be associated with a security level (or levels), and the server 110 can determine the proper procedures to authenticate various users trying to access the content. Security levels associated with content may be determined automatically by the system (for example, by comparing data in the content to data in the data store 118 that already has security levels configured), or manually entered by a content creator or administrator.

Figure 2:
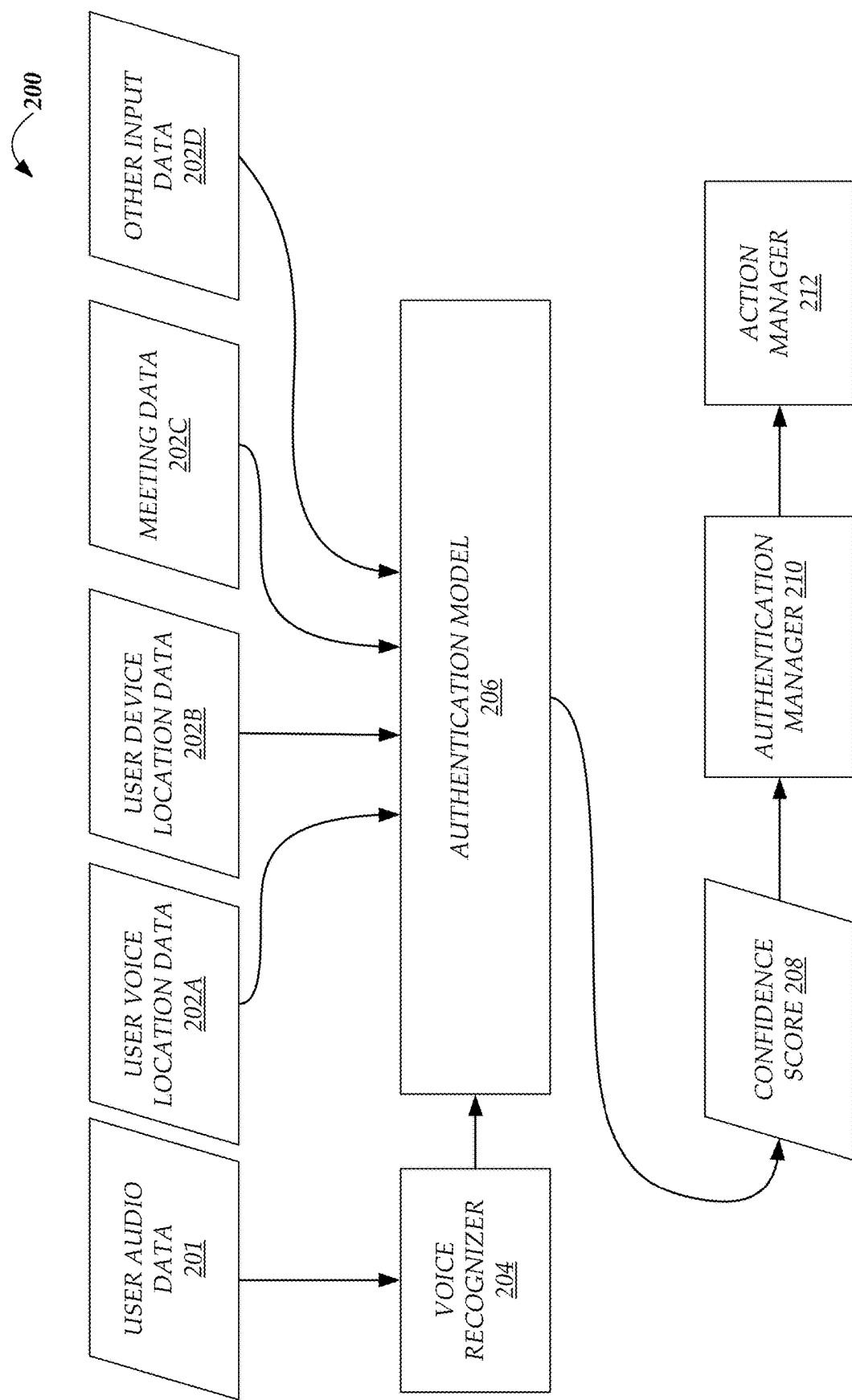
FIG. 2 is a flow diagram depicting an illustrative process for identifying various inputs related to a user and a meeting, authenticating the user, and taking an action, according to some embodiments.

FIG. 2 depicts an illustrative authentication process 200 of using an authentication model 206 (also referred to simply as a "model") to process various inputs related to a user and generate output, such as a confidence score 208 (also referred to herein simply as a "score" for convenience). In some embodiments, the confidence score 208 may represent a confidence that a user is in a specific location (e.g., a room or geolocation), or in a relative location (e.g., near a particular communication device 102). In some embodiments, the confidence score 208 may represent a confidence that a current user at a location, such as a meeting location, has been authenticated as being associated with a particular user account. Such a user may also be referred to as a "meeting participant" or "meeting attendee." A system may then take an action based on the score, according to some embodiments. The descriptions herein regarding actions taken by the communication device 102 or the server 110 may be performed by either system or both, depending on the implementation. Moreover, there may be some embodiments where the communication device 102 or server 110 comprises multiple systems or components to perform the same or similar functions described herein.

In some embodiments, as shown in FIG. 2, inputs for the authentication model 206 may include user audio data 201, user voice location data 202A, user device location data 202B, meeting data 202C, other relevant input data 202D, or some combination thereof.

The user audio data 201 may represent a user's voice (e.g., an utterance of the user). In some embodiments, the user audio data 201 may be limited to various phrases. The user audio data 201 may be analyzed by a voice recognizer 204 using a voice model or a set of voice models, for example, prior to analysis by the authentication model 206. Each voice model may be trained by a user or using a voice of a user, and stored in a data store, such as in a server 110 (e.g., data store 118). In some embodiments, the voice model is stored on the communication device 102 (see FIG. 1). The voice recognizer 204 may determine that the user audio data 201 best matches a particular voice model, or matches a particular voice model within a certain threshold. For example, the voice recognizer 204 may process the user audio data 201 against a plurality of voice models, such as one model for each user expected to be present at a meeting, one model for each user determined to likely be within the vicinity of the communication device 102, etc. The voice recognizer 204 may output user identification data that identifies the particular user model (or user account profile, or some other user-specific data) associated with the user whose voice is most likely represented by the user audio data 201. In some embodiments, the degree of confidence that user audio data 201 matches a particular voice model may be a factor in the confidence score 208. As another example, the voice recognizer 204 may output a set of scores for each voice model against which the user audio data 201 was processed (or some subset thereof, such as the top N-best scoring models), where individual scores represent a degree of confidence that a particular user's voice is represented by the user audio data 201.

The user voice location data 202A may represent a location (or likely location) at which an utterance of a user occurred. In some embodiments, the voice location data 202A may be based on a location of a microphone or other sensor that generated audio data representing a detected utterance. For example, a microphone 116 of the communication device 102—or in communication with the communication device 102—may capture the utterance and generate audio data representing the utterance. The microphone 116 (or the communication device 102) may be associated with a particular location, such as a geographic location or a room within a building. Because the microphone 116 was able to capture the utterance, it may be assumed that the user was at or near the location of the microphone 116 when the utterance was made. Therefore, the voice location data 202A may be determined to be the location of the microphone 116 (or another associated location, such as a location of the communication device 102), or to be a location in proximity to the location of the microphone 116 (e.g., within a predetermined or dynamically determined threshold distance, such as a distance based on a signal strength, signal-to-noise ratio, or some other metric).

In some embodiments, the voice location data 202A may include information regarding the location of multiple microphones 116, such as each microphone that captured the utterance. In these embodiments, the voice location data 202A may represent the identities and/or locations of each microphone that captured the utterance and generated audio data representing the utterance. Additionally, or alternatively, the voice location data 202A for a particular microphone 116 may represent a confidence that the user was closest to that microphone 116 when the utterance was made, an energy level of the detected utterance, or some other relative metric. In some embodiments, voice location data 202A may represent locations of devices or objects instead of, or in addition to, a microphone 116 of a communication device 102. For example, a microphone of a user device 108 may capture an utterance, and the location of the user device 108 may be represented by the voice location data 202A.

The user device location data 202B may represent a location (or likely location) of a user device 108. In some embodiments, the user device location data 202B may be based on or generated by the user device 108. For example, the user device location data 202B may be based on global positioning system (GPS) coordinates or output associated with the user device 108. As another example, the user device location data 202B may be based on wireless-based location determination methods, such as wireless triangulation, analysis of identifiers of nearby wireless access points (e.g., service set identifiers or SSIDs), or the like. The user device 108 may provide such user device location data 202B to the server 110, communication device 102, or some other system or device. In some embodiments, the user device location data 202B for a particular user device 108 may be based on a location associated with another device, such as the communication device 102. For example, the communication device 102 may transmit ("broadcast") a beacon signal that is detectible by nearby devices. The beacon signal may include information representing the location and/or identity of the communication device 102, or information from which the location and/or identity can be derived. The user device 108 may detect the beacon signal and extract its payload for processing locally or remotely, such as by the server 110. From the beacon signal data, the location of the source of the beacon signal (e.g., the beacon transmitter 115) can be determined. Because the user device 108 was able to detect the beacon signal, it may be assumed that the user device 108 was at or near the location of the source of the beacon signal. Therefore, the user device location data 202B may be determined to be the location of the beacon transmitter 115 (or another associated location, such as a location of the communication device 102), or to be in proximity to the location of the beacon transmitter 115. Examples of beacon signals and the generation, detection, and processing thereof are described in greater detail below.

The meeting data 202C may represent a meeting location or some other scheduled location. The scheduled location may be determined using meeting data that represents a time, location, and/or list of invitees. The meeting data may be stored at the user device 108, communication device 102, server 110, some combination thereof, etc. For example, a particular user may maintain a calendar with meeting data, which may be stored on the user device 108 or accessible from a network location (such as the server 110). As another example, a particular location may be associated with a calendar, such as a room or enterprise. As yet another example, a particular communication device 102 may be associated with a calendar, or with the calendar of the location at which the communication device 102 is installed or in use. When the process 200 is performed, a relevant calendar or other source of meeting information may be accessed, depending upon a detected user or user device 108, a source of certain input data, or some other factor.

Other input data 202D may represent various other location data, data from which a location may be determined, or other data that may otherwise affect a determination of a location or a confidence score 208. For example, other input data 202D may represent a location of a camera that has generated image data of facial features of a user. The user may be associated with a facial feature recognition model, and the image data may be processed to determine an identity of the user, a confidence that the image data represents a facial feature of the user, or the like. The facial feature recognition process may be similar to the process for performing voice recognition as described above. As another example, other input data 202D may represent a location of another user device 108 (or multiple user devices 108) separate from a user device 108 associated with a user for whom a confidence score 208 is currently being generated. As further examples, the other input data 202D may represent data regarding infrared cameras (to detect the number of meeting participants or location of various meeting participants, for example), chair sensors, or door sensors to monitor opening and closing of an entrance or exit, etc.

The confidence score 208 may be a value based on the authentication model's 206 analysis of some or all inputs. In some embodiments, the authentication model 206 (also referred to simply as a model for convenience) may be a statistical model, classifier, regression model, logic-based network, or some other model that may be used to correlate input data (such as voice recognizer 204 output, user voice location data 202A, user device location data 202B, meeting data 202C, other input data 202D, or some combination thereof) with a particular location, set of locations, or confidence in a determination of a location or set of locations. For example, the authentication model 206 may be a neural network, conditional random field, random forest, some other machine-learned model, etc.

Input data representing an input vector may be generated using the various inputs described above, other inputs, or some combination thereof. The model 206 may then process the input vector and generate output representative of a location, confidence in a location determination, or output from which a location can be derived. In one specific, non-limiting embodiment, the model 206 may be a neural network. The input vector may include any number of data elements, corresponding to the different input data that the neural network is to consider (e.g., a first element for user voice location data 202A, a second element for user device location data 202B, a third element for meeting data 202C, a fourth element for other input data 202D). The neural network may compute intermediate representations of the input data, also referred to as "hidden layers," by multiplying the different input data elements by different weights, and combining the results using various activation functions (e.g., sigmoid). The neural network may continue to generate zero, one, or more intermediate representations using different weights. Finally, the neural network may generate an output vector that represents the output of the model 206, such as one or more confidence scores 208. The description of the neural network-based model 206 is illustrative only, and is not intended to be limiting. In some embodiments, other neural network processing may be used, or other modeling techniques altogether.

In some embodiments, the model 206 may be or include a set of rules for determining locations, confidence scores, and the like using the various input data. For example, the authentication model 206 may consider user device location data 202B and user voice location data 202A. If the user device location data 202B and the user voice location data 202A represent the same location, or locations within a threshold distance, a confidence score 208 representing a degree of confidence that the user is currently at the location represented by the user device location data 202B and/or user voice location data 202A may have a value signifying a high degree of confidence that the user is at the location.

In some embodiments, the authentication model 206 may consider user location (for example, based on user voice location 202A and/or user device location 202B) compared to meeting data 202C or other data regarding an expected location of a user or group of users. The meeting data 202C may include information on meeting start and end times, meeting location, meeting presentation content, confirmed meeting participants, meeting invitees, or any other information related to a meeting. If the locations represented by the user voice location data 202A, user device location data 202B, and/or meeting data 202C location are the same or within a certain threshold distance, the confidence score 208 may have a value signifying a high degree of confidence that the user is at the location represented by the considered data.

The authentication model 206 may also consider user device location data 202B over time as compared to the meeting data 202C. For example, the comparison can be used to confirm that the user device could realistically arrive in the meeting room at the particular time. If the user device location data 202B changes too rapidly (for example, travels from London to New York in seconds), the confidence score 208 may decrease based on the unrealistic measurements. The decrease in confidence score 208 based on this analysis may still occur even if the user device location data 202B signifies a location in the meeting room. This analysis may be advantageous to detect location spoofing of a user device location.

In some embodiments, the authentication model 206 may consider the device location or voice location of other meeting participants, either present at the meeting or listed in the meeting data 202C. For example, the confidence score 208 may be higher based on a meeting that has many meeting participants versus a meeting with fewer participants because more people in the room may imply a legitimate meeting is taking place.

The authentication model 206 may also consider the user's meeting history to base the confidence score 208 on meetings and authentication analyses performed in prior meetings. For example, if the same meeting participants meet every week at the same or similar time, and each week the user is authenticated similarly, the confidence score 208 may increase based on the repetitive meeting and authenticating. In some embodiments, the authentication model 206 may also consider other users' meeting and authentication history similarly to the data from the user. For example, other users attending the same meeting on a regular basis with the user may increase the confidence score 208 based on the repetitiveness of the meetings.

In some embodiments, the authentication model 206 may consider the number of meeting participants invited to the number of meeting participants checking in or showing up to the meeting. The higher percentage of people attending the meeting compared to those invited may lead to a higher confidence score 208. Meeting participants may be measured by monitoring the location of their phones, seat sensors, infrared sensors, cameras, audio data, voice location data, or any other detectable input available to the authentication model 206. Also, in some embodiments, the number of meeting participants present during the meeting may also be relevant in calculating the confidence score. For example, the more meeting participants present the higher the confidence score 208 may be.

The authentication model 206 may also consider the location of a beacon transmitter 115 over time. In some embodiments, a location represented by a beacon signal is associated with a room or communication device 102 so that the locations represented by beacon signals detected be various user devices 108 can be determined relative to the beacon transmitter 115 location. If the beacon location changes frequently or over time, a confidence score 208 may decrease to signify that there is less confidence of various other inputs based on the uncertain and frequent changing of the beacon location.

After a confidence score 208 is generated or determined by process 200, an authentication manager 210 determines whether the user and/or determined user location should be authenticated by the process 200 based on the one or more factors described herein. Upon determination by the authentication manager 210, various actions taken by an action manager 212 may occur. For example, the communication device 102 may provide access to secure information if an authentication is successful or restrict access to secure information if an authentication is not successful. Other example actions are described in greater detail below.

Also, in some embodiments, the communication device 102 may consider the other meeting participants to decide whether to provide access to secure information. For example, the Chief Financial Officer of a company may be in a meeting with people from various departments, including a marketing intern. Certain financial information may be available to the CFO, but not the marketing intern. Depending on preconfigured setting associated with the data in the organization, the communication device 102 may restrict access to the CFO during the meeting until the marketing intern leaves the room or until the rule is overridden by one or more overriding procedures. In some embodiments, a user may choose to override security or feature or data restrictions and in some instances, that may be possible by providing additional authentication information if permissions for their user account allows for such overriding access.

Figure 3:
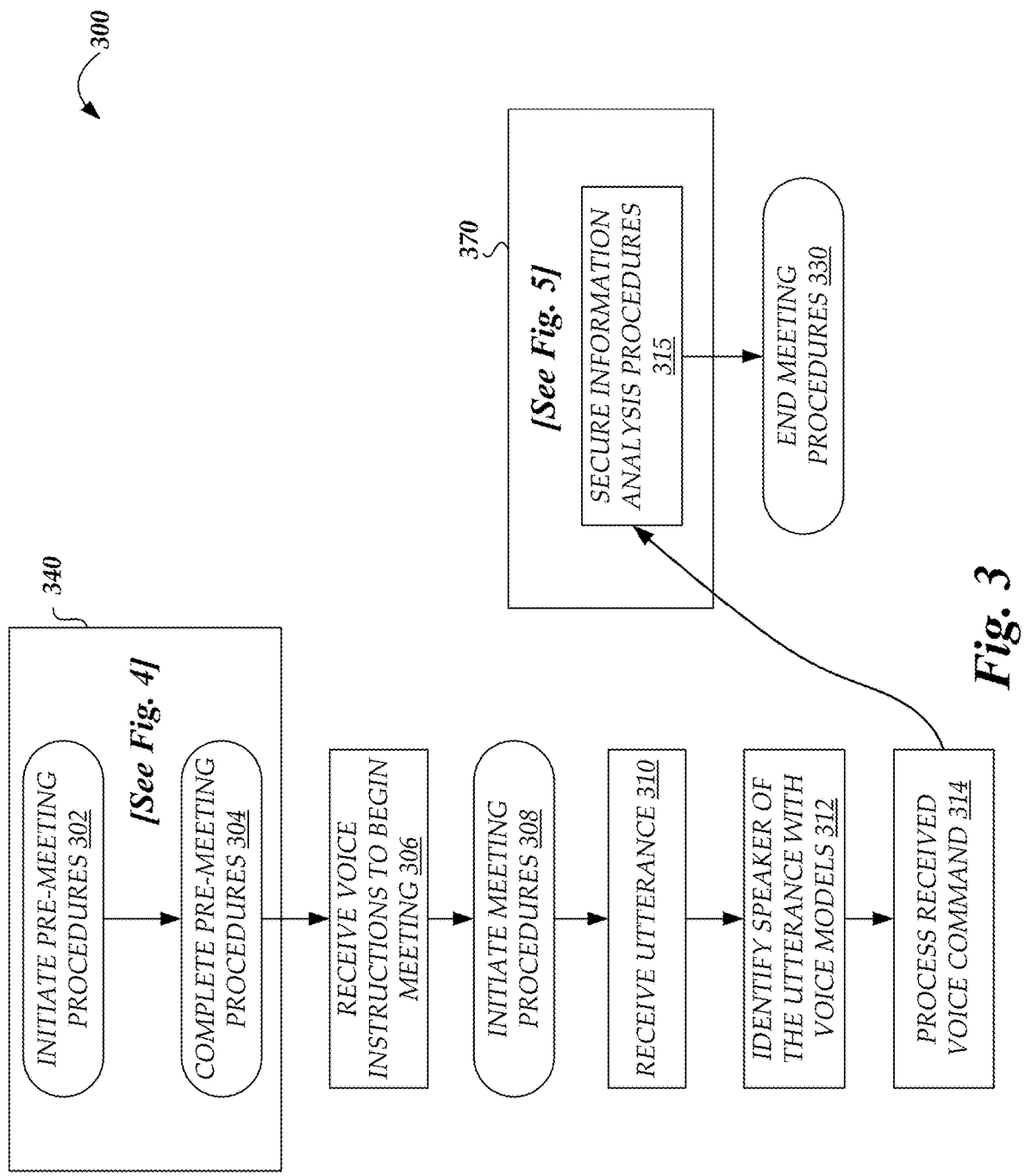
FIG. 3 is a flow diagram depicting an illustrative process of preparing for a meeting and interacting with meeting participants according to some embodiments.

FIG. 3 is a flow diagram depicting a general illustrative process 300 of preparing for a meeting and interacting with meeting participants and a database during a meeting. The process 300 will be described in connection with the example flow charts shown in FIGS. 3, 4, and 5, and by the systems described in FIGS. 6, 7, and 8. However, the examples are for illustration only, and are not intended to be limiting. In some embodiments, the process 300 or portions thereof may be used in connection with different actions, inputs, output, or order of the actions, inputs, or outputs by the systems.

For example, the communication device 102 may initiate pre-meeting procedures 302 at some point prior to a meeting. In some embodiments, pre-meeting procedures may occur upon scheduling of the meeting, months, weeks, days, hours, or at any point prior to a scheduled meeting. The pre-meeting procedures may also not initiate at all in certain situations. The pre-meeting procedures may initiate or be based on specific meeting data associated with a user calendar or room calendar, or both. Pre-meeting procedures may include monitoring detectable devices (for example, SSIDs of wireless networks, beacon signals from communication devices 102 nearby, or others), updating other calendars, downloading voice models for attendees of the scheduled meeting, downloading any relevant data for the meeting (for example, presentation files to be used for the meeting), unlocking doors, sending email updates to one or more attendees, removing security access to particular network or local files, or other features in preparation for the meeting.

In some embodiments, pre-meeting procedures may be performed on an ad hoc basis, without any specific meeting data associated with a user calendar, room calendar, or other schedule information. Illustratively, the communication device 102 may proactively receive voice models for users detected nearby, or who are determined to be likely nearby. For example, the server may determine which users are likely to be nearby based on confidence scores determined as described above (e.g., based on likely locations of user devices, etc.), and may send corresponding voice models to the communication device 102 prior receiving any utterances from the nearby users to be processed. In some embodiments, the voice models may be proactively stored at the server 110 or some other location for use in server-side processing of user voice audio data.

Once the pre-meeting procedures 302 are complete, the communication device 102 can complete the pre-meeting procedures 304 prior to the meeting start time. In some embodiments, the pre-meeting procedures 302 may be completed upon voice instructions 306 signifying the beginning of a meeting. For more details regarding pre-meeting procedures 340, please see detailed description of FIG. 4.

In some embodiments, upon completion of the pre-meeting procedures, the communication device 102 may receive voice instructions to begin a scheduled meeting 306. There may be distinct meeting procedures that are then run to begin the meeting. These meeting procedures 308 may include taking attendance via voice data and/or user device data, or both. For example, the process 200 described above may be performed with respect to each invitee and/or each user detected at the meeting location (e.g., within a communication range and/or threshold distance of the communication device 102). A set of scores may be generated for each invitee and/or detected user. Individual users may be noted as present based on an analysis of their corresponding scores (e.g., the scores may be compared to predetermined or dynamically determined thresholds, the scores may be compared to each other, etc.). Additional meeting procedures 306 may also include beginning the recording and/or transcribing of the meeting for review later or to include in meeting minutes.

In some embodiments, there may be different sets of meeting (or pre-meeting) procedures that may be performed depending upon a context in which the meeting is to occur. The communication device 102 may determine the context of the meeting, determine whether the context is associated with specific meeting procedures, and implement those procedures. For example, the communication device 102 may, in some embodiments, turn off certain default meeting procedures for meetings where confidentiality is important, such as a meeting with a user tagged as an attorney, or a meeting that has been tagged as confidential.

One aspect of the meeting procedures that may be implemented in some embodiments is an operation or set of operations to improve the communication device's 102 ability to monitor and receive voice commands 310 from meeting participants (users, attendees, invitees, or anyone else in the meeting room during the meeting). Upon receiving a voice command 310, the communication device 102 may begin processing to identify the speaker 312 of the utterance 310. In some embodiments, audio data representing the utterance 310 is compared to one or more voice models to identify the speaker 312 of the utterance 310. As described herein, it may be advantageous during the pre-meeting procedures to download voice models associated with all meeting participants, or potential meeting participants (for example, through meeting history data for each user, calendar analysis, or machine learning). Doing so may aid the communication device 102 to execute a voice analysis more quickly (for example, see analysis 104 in FIG. 1 as described above) without communicating to a server 110 (e.g., to retrieve voice models), and to hedge against any potential connection issues to a server 110. Upon identifying the owner of the voice command, the communication device 102 will process the voice command 314 accordingly. For example, the communication device 102 may perform secure information analysis procedures 315 for any secure information that may be requested by a meeting participant. Processing of a voice command 370 is described in greater detail below with respect to FIG. 5.

In some embodiments, the server 110 may perform some or all of the processing of user utterances. In these embodiments, certain voice models may be pre-loaded at a particular server device or instance in order to realize the processing efficiencies described above with respect to a communication device 102. For example, meeting procedures (or pre-meeting procedures) may include pre-loading the voice models for the expected meeting participants to the server device and/or instances that are expected to process utterances captured by the communication device 102.

When the meeting participants are finished with the meeting, or upon reaching the scheduled end time of a meeting, the communication device 102 may begin end meeting procedures. In some embodiments, the end meeting procedures may include activating an indicator (for example, a beep or light) indicating the meeting will be ending soon or has ended. Additionally, the end meeting procedures 330 may prompt the meeting participants to provide specific input related to the ending of the meeting. For example, the communication device 102 may ask the meeting participants one or more of the following: "Do you need more time?," "Would you like me to send a copy of the meeting transcript or meeting minutes to the entire list of attendees or a particular person?," "Would you like me to discard the meeting minutes?," "Would you like me to notify the administrator or next group scheduled to meet in this room that you are completing your meeting?," or anything else useful to the meeting participants, administrators, or company.

Figure 4:
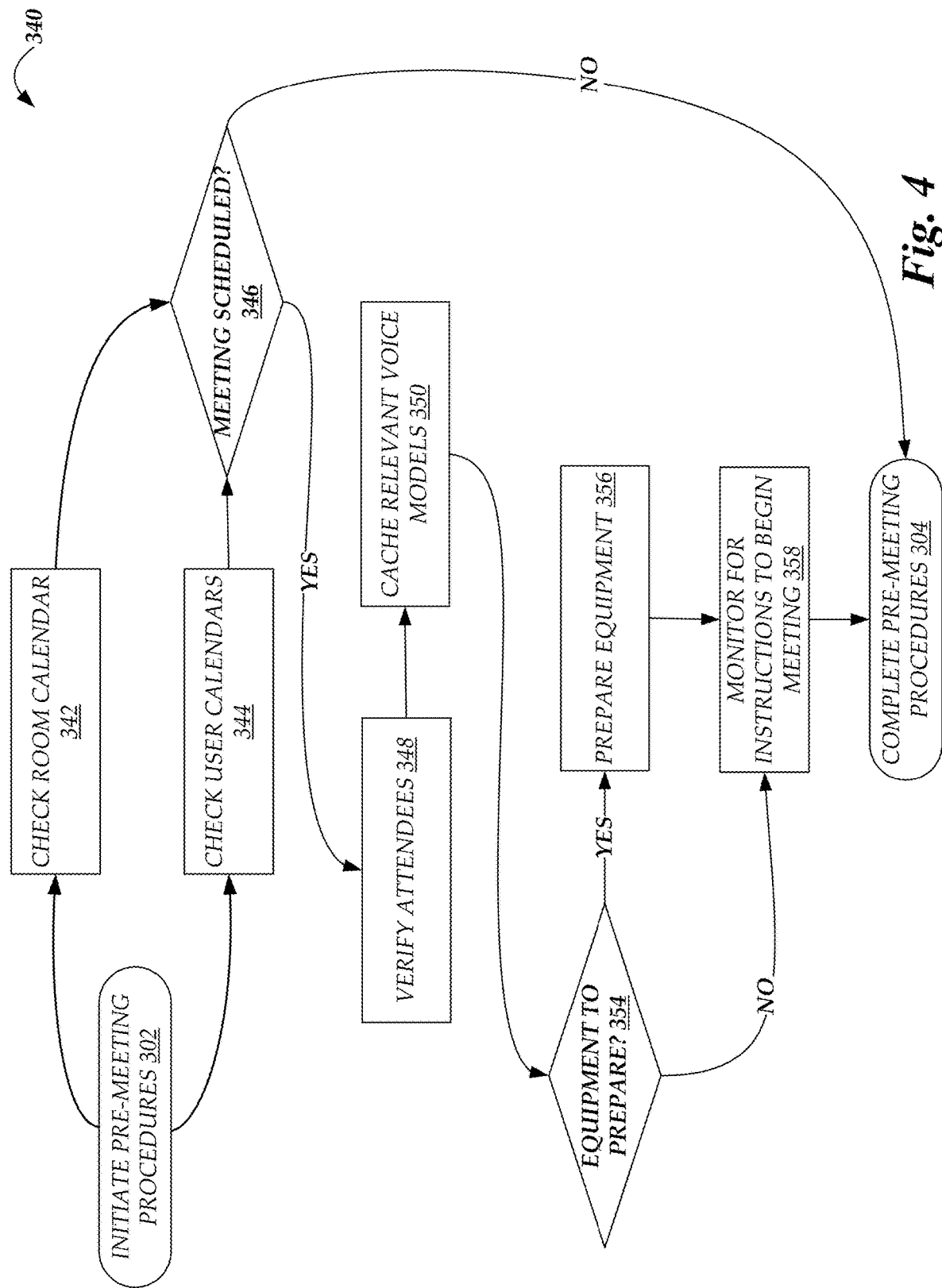
FIG. 4 is a flow diagram depicting an illustrative process of preparing for a meeting according to some embodiments.

FIG. 4 is a flow diagram that describes in more detail some embodiments of pre-meeting procedures that may be performed by the communication device 102 and/or a server 110 prior to starting a meeting.

For example, the communication device 102 (or a server 110 in some embodiments) may check the room calendar 342 at a regular interval or upon request to determine whether a meeting is scheduled for the particular room associated with the communication device 102. In some embodiments, the communication device 102 may remain in a fixed location, such as a meeting room, and a calendar may be associated with each particular communication device 102. This is advantageous because it allows a user to book the room and ensure no one else will schedule a meeting at a time that overlaps with the user's meeting. In some instances, the communication device 102 will check room calendars of other communication devices 102 to determine occupancy rates of the meeting rooms at various times.

In some embodiments, the communication device 102 may check one or more user calendars 344 to determine if any users require the room. In some embodiments, the room itself may be marked as a meeting destination on a user calendar (personal or work, for example). In other embodiments, the communication device 102 may analyze user calendars and determine a room should be reserved based on various criteria (for example, all but one room may be booked at the particular time and the communication device 102 may determine it should reserve the room automatically or prompt the meeting creator that the room should be booked soon). In some embodiments, the communication device 102 may check the user calendars or room calendars are regular time intervals, or upon request, and update other calendars or process any meeting events accordingly and as described herein. For instance, some meeting invitations may have particular instructions that the communication device 102 may need to perform separate from the pre-meeting procedures outlined herein and FIG. 2. For example, if a meeting requires catering, a separate email may be forwarded to a catering department to prepare food in time for the meeting. If additional hardware is needed in the room, an email may be forwarded to the IT department to install such hardware prior to the meeting, for example.

After checking the various calendars in 342 and 344, the communication device 102 and/or server 110 can determine if a meeting is scheduled in block 346. If a meeting is not scheduled, the communication device 102 and/or server 110 may complete any pre-meeting procedures that are programmed into the communication device 102 and/or server 110 in block 304. If a meeting is scheduled, the communication device 102 and/or server 110 may then proceed to block 348.

In block 348, the communication device 102 and/or server 110 can verify attendees of the meeting. This may include all users invited to the meeting, users that confirmed they will attend the meeting, or any other user typically at such a meeting but may not have been invited due to human error. Determinations of typical meeting participants may be done through machine learning or other similar process.

In block 350, once a broad list of possible users is determined in block 348, the communication device 102 and/or server 110 may cache relevant voice models. It should be appreciated that in some embodiments, the communication device 102 and/or server 110 may already include all necessary voice models and this block may be skipped. In one embodiment, at some time prior to the scheduled meeting, the communication device 102 and/or server 110 may begin tracking user device location as an input to the authentication model in 206 to help in the determination of a confidence score.

In block 354, the communication device 102 and/or server 110 may determine whether there is any equipment to prepare for the room. If there is equipment to prepare, such as loading a presentation on a display screen (see display screen 106 in FIG. 1), the communication device 102 and/or server 110 may prepare a document (convert the document to the proper format, for example) and prepare the display screen (turn it on and adjust the display settings, for example) and load the document on the display screen prior to the meeting or once all meeting participants are checked-in or verified for the meeting. If there is no equipment to prepare, the communication device 102 and/or server 110 may monitor for instructions to begin the meeting in block 358, which can also complete the pre-meeting procedures.

In some embodiments, the system may also determine whether any additional parties need to be contacted to assist in preparing catered food, special equipment, special lighting, or any other custom preferences. The communication device 102 and/or server 110 may then contact such parties. It should be appreciated that the more the communication device 102 and/or server 110 can control, the additional features will be available to the user to control through the meeting request or modifications without the communication device 102 and/or server 110 emailing additional people.

Figure 5:
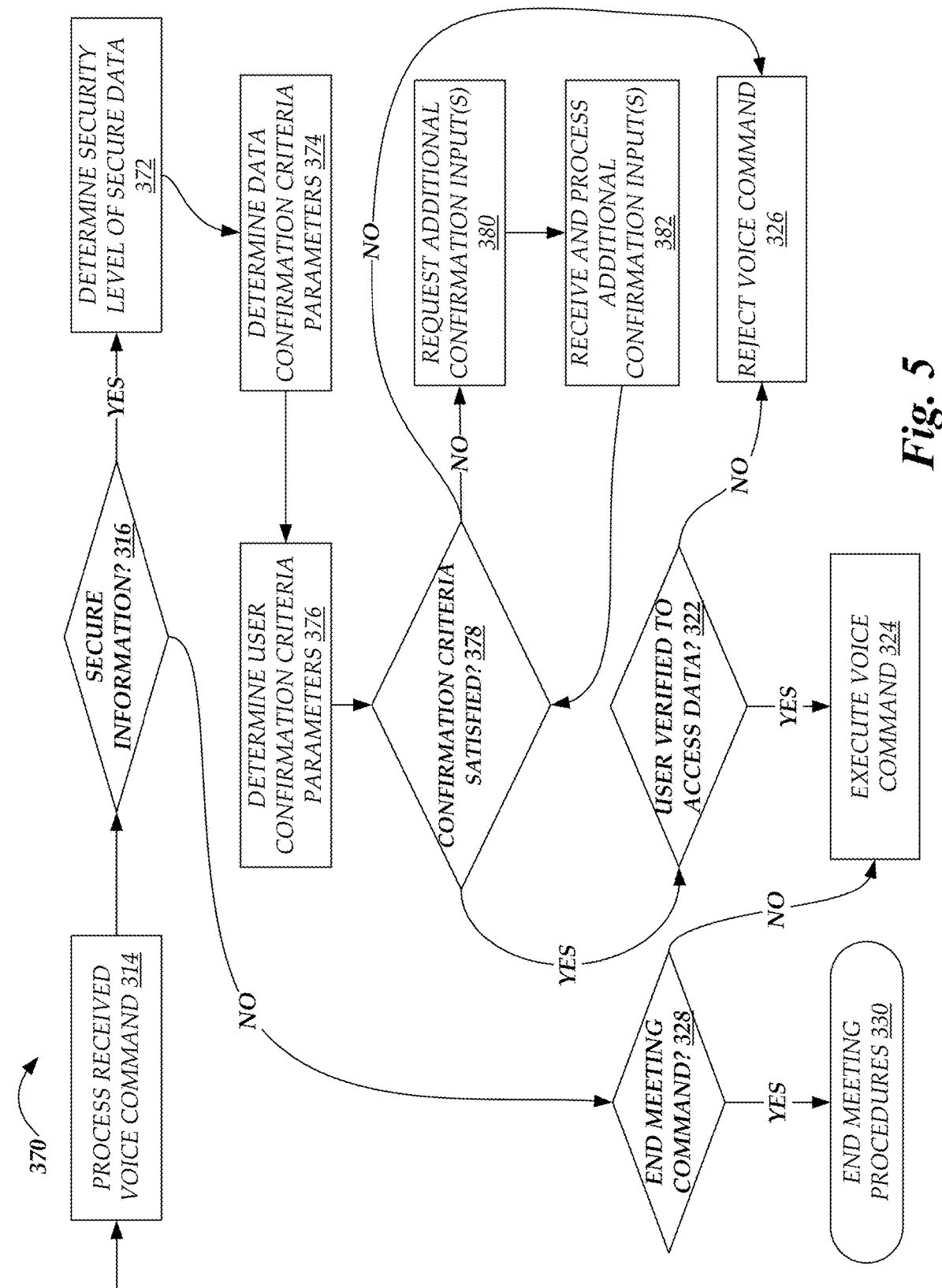
FIG. 5 is a flow diagram depicting an illustrative process of authenticating a meeting participant's access to secure data according to some embodiments.

FIG. 5 is a flow diagram depicting an illustrative process 370 of authenticating a meeting participant's access to secure data. Continuing from block 314 in FIG. 3, at block 316 the communication device 102 and/or server 110 first checks whether the received voice command is a voice command for interacting with any information that is classified as secure. In some embodiments, users or administrators may manually set the security settings of some or all of stored data; the process may automatically set the security for some or all of the stored data; or a combination of both. The process may be implemented by the server 110, the communication device 102, or both.

If data requested or interacted with by the voice command 314 is determined not to be secure, then in block 328 the communication device 102 and/or server 110 checks if the voice command is an end meeting request or command. If the voice command is an end meeting request, then the process may run the end meeting procedures in block 330. If the voice command is not an end meeting request, and is not requesting secure information, then the process may execute the voice command in block 324.

If data requested to be accessed or otherwise interacted with by the voice command 314 is determined by block 316 to be secure, then at block 372 the communication device 102 and/or server 110 may determine the security level of the requested secure data. In some embodiments, secure data may have varying levels of security. For example, there may be multiple tiers of security designated by name ("classified," "highly classified," "confidential," "privileged", for example), by number (1 to 10, for example), or any other way of signifying the levels of security. In other embodiments, there may only be one security level associated with secure data so that the database only comprises unsecure data and secure data.

Once the level of security associated with the requested data is determined in block 372, the communication device 102 and/or server 110 can determine data confirmation criteria parameters 374 associated with the data and/or security level of the data. For example, each security level of data may require varying confirmation criteria to allow a user access to the data. The most secure tier of data may require a higher confidence score to authenticate the user. The least secure tier may require a less stringent set of inputs, or a lower confidence score, to authenticate the user. So, varying inputs, or combinations of inputs, may be required to access the data. It should be appreciated that the inputs and combinations of inputs may be associated with a specific confidence score needed. Different scores for different users may be required, as discussed in block 376.

In block 376, the communication device 102 and/or server 110 can determine user confirmation criteria parameters. For example, the process will determine what inputs (or combination of inputs) may be required for the particular user to access the secure data. Users may have varying clearance levels associated with their accounts. Depending on the clearance levels, there may be additional inputs or fewer inputs required (a lower or higher confidence score, for instance) to access the secure data.

Upon determining the confirmation criteria parameters for the data and the user, the communication device 102 and/or server 110 then determines whether the confirmation criteria is satisfied in block 378. If the criteria are not satisfied then the process may ask the user for additional confirmation inputs 380 to try and increase the confidence score. In some embodiments, the process may automatically determine whether to request additional inputs or to move directly from block 378 to block 326. For example, if the confirmation score of a user is very low and more than one additional input would be required to reach the appropriate confidence level then the process may be programmed to skip blocks 380 and 382 and reject the voice command in block 326. However, if the process is configured to request the additional confirmation inputs in block 380, then the process does so.

In block 382, the communication device 102 and/or server 110 receives and processes any additional confirmation inputs received from the user. Some inputs may include additional audio data where a user speaks a particular phrase to the communication device 102, provides biometric data (e.g., a face, finger, or iris scan), or types in a password via a terminal, for example.

If the confirmation criteria are satisfied in block 378, then the communication device 102 and/or server 110 checks if the user is verified to access the data 322. It should be appreciated that in some embodiments a user may have a security clearance associated with the user separate and distinct from the communication device's 102 authorization determination disclosed herein. For example, a particular user may have the appropriate security clearance to interact with a particular piece of secure data; however, if the process cannot determine a confidence score to a sufficient degree, then the process may not authenticate a user based on the user's voice or inputs. In the case where a user has clearance but has not been authenticated, the process may not provide access to the information or may require additional inputs to try and increase the confidence score to enable authentication of the user. If the user is verified to access the data, then the process executes the voice command in block 324. If the user is not verified to access the data, then the process rejects the voice command in block 326. In some embodiments, there may be an indication to the user regarding the execution or rejection of the voice command. For example, there may be varying light patterns, light color, or sounds transmitted to the user to signify a rejected or executed voice command.

Figure 6:
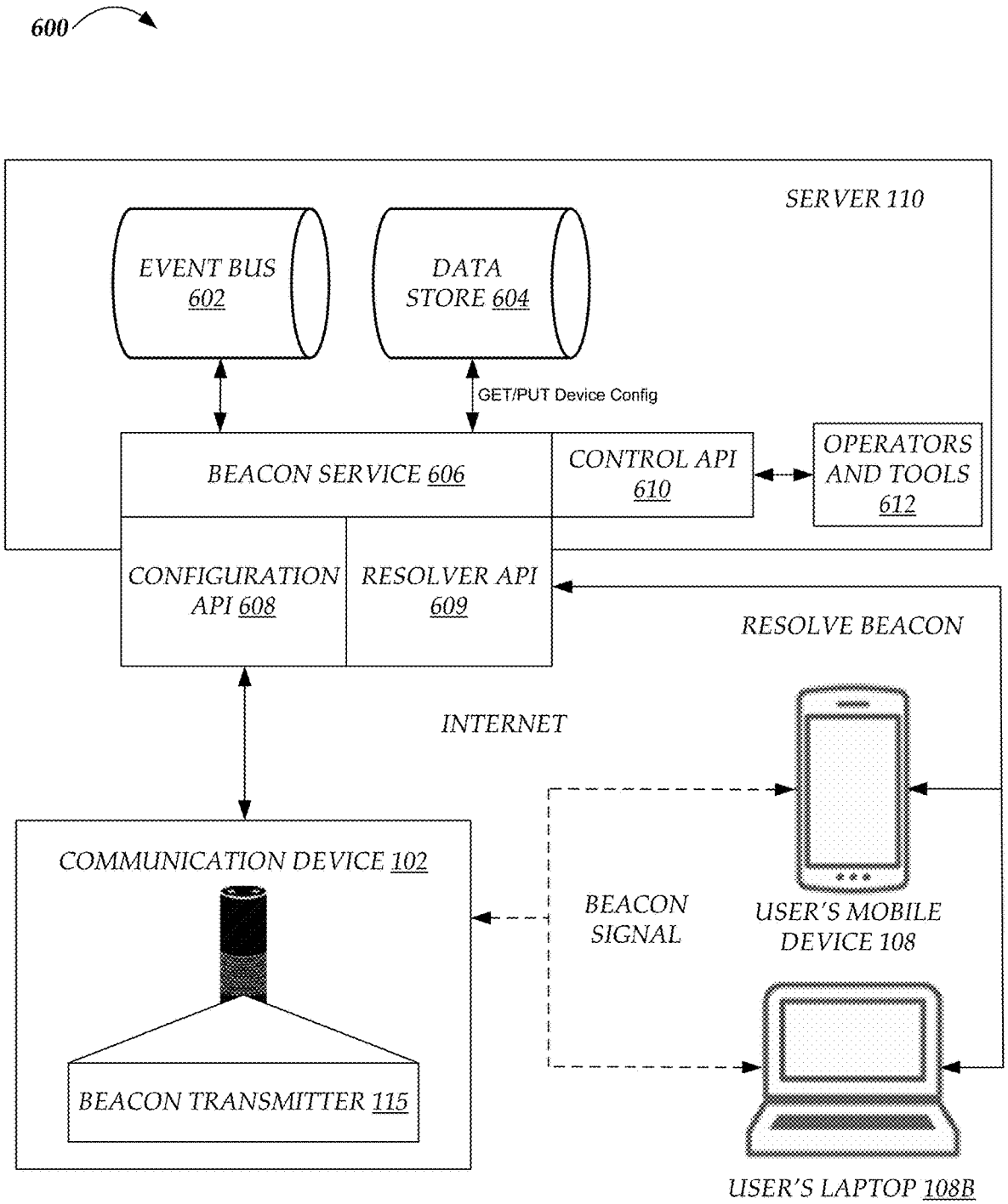
FIG. 6 is a block diagram showing illustrative data flows and interactions between components of a beacon service according to some embodiments.

FIG. 6 is a block diagram showing an illustrative representation of a beacon service 600 implemented using the server 110, communication device 102, and user devices 108. The beacon service 600 determines which user is at or near a location, and/or whether a user is at or near a location, based on interactions with the user's device 108. In some embodiments, the information processed using the beacon service 600 can be used to determine what user is actually talking to a communication device 102. The beacon service 600 may also be used to determine which users may be near the communication device 102 at this point in time (e.g., as a proxy for separately determining the locations of the individual users). The devices as described in FIG. 6 may be a communications device 102, user device 108 or 108B, or any electronic device that has beacon capabilities.

In some embodiments, a beacon signal may be a form of Bluetooth® Low Energy (BLE) advertisement packet. In one specific, non-limiting example, a BLE advertisement packet may have a max length of 31 bytes, and of these, 11 bytes may be used for protocol level data (e.g., data not used to transfer useful data). In the present example, this leaves 0 to 20 bytes of usable payload information. The broadcasted information may contain three data elements. The beacon payload structure may include 1 byte designating a format of the content, 8 bytes for a device identifier of the device broadcasting the beacon signal (the source of the beacon signal), and 6 bytes for data generated using a Time-based One-Time Password (TOTP) algorithm.

The TOTP data may be a 256-bit random value generated by using a particular identifier, which may be the same as, or different than, the device identifier. The TOTP data may be associated with a time step, and therefore may serve to limit the time period in which the beacon signal (or more specifically, the data represented by the beacon signal) is valid. The time step may be a time window for which there is one value for the TOTP data. The duration of the time step size can be flexible (e.g., as long as agreed upon by both the communication device 102 and server 110). It could be as short as one second (or shorter) or as long as 1 hour (or longer). In some embodiments, additional and/or alternative time-based data may be included in a beacon signal, or no time-based data may be included.

In some embodiments, a server 110 may include a beacon resolver service accessible via a resolver application programming interface ("API") 609. The resolver service may determine what beacon signal belongs to what communication device 102 through the use of device identifiers. For example, device identifiers may be static device level identifiers that can be used by the resolver service to find which device broadcasted the beacon signal. Without a device identifier, the resolver service may not be able to determine which device broadcasted the beacon signal. Also, a device identifier may identify which device broadcasted an associated TOTP. Without knowing the device identifier of the device that broadcasted the TOTP, the server 110 may not be able to compute the valid TOTP for a device because the server 110 may not be able to identify which device secret key it should use.

For example, a device identifier may be retrieved by the communication device 102 from the configuration API 608 on the server 110 when the communication device 102 boots up. Illustratively, the device identifier may be a unique identifier generated by the configuration API 608 prior to returning it to the device in order to avoid collisions on the device identifier. The configuration API 608 may be used to provide configuration data to the beacon transmitter 115. The configuration data may include a beacon payload to be broadcasted by the beacon transmitter 115. The configuration data may also include a device identifier, the type of beacon, a secret key used to compute a TOTP, time step representing a beacon rotation interval that is based on computing a new beacon at every interval, a name for the beacon, the broadcast power of the beacon, and the pull interval that describes the amount of time between two pulls of the configuration. In some embodiments, device identifiers are static device level identifiers that can be used by the beacon resolver service to find which device broadcasted the signal.

The TOTP may be defined according to Request for Comments (RFC) 6238 as published by the Internet Engineering Task Force (IETF), or any other applicable standard. In some embodiments, the TOTP may be generated using the local device time and a secret key unique to the communication device 102. For example, communication devices 102 may use NTP (Network Time Protocol) to synchronize the time. Such a configuration may be advantageous because it makes the internal clock reliable and self-correcting, which reduces the risk of major clock drifts. In some embodiments, the actual TOTP part of the message may be configured to comprise 6 bytes. The minimum recommended by the RFC is a 6-digit output that may be encoded in the 6 bytes. For example, the TOTP may be computed using the following information and by the following formula:

T: The current Time using a unix timestamp in seconds.
TS: The Time Step represents the time between each new TOTP (300 for 5 minutes, for example)
SK: The Secret Key used by the device. Each device may receive a personal secret key during provisioning. The SK can be modified at the device level via a dynamic configuration.

The following formula based on the RFC 6238 computation rule may be used to compute the TOTP.

$$TOTP = SHA256\left(SK + \text{floor}\left(\frac{T}{TS}\right)\right) \bmod 1e7$$

In some embodiments, the communication device 102 broadcasts a beacon signal that includes at least the unique identifier assigned by the configuration API 608 on the server 110 and generated TOTP data. A user device 108 may detect the beacon signal and provide the beacon signal data to the beacon service 606. In some embodiments, the user device 108 may also provide additional information in, or alongside, the beacon signal data, such as data regarding the location of the user device (e.g., GPS, SSID triangulation info, etc.).

The server 110 via the beacon service 606 may determine, based on the beacon signal from the communication device 102 and/or the beacon signal from the user device 108, which device (e.g., communication device 102 or user device 108) originally broadcasted the beacon signal. For example, the determination of which communication device 102 is associated with which beacon signal may be determined by the server 110 because each unique identifier associated with the beacon signal has been assigned to only one device for a certain time interval (reflected by the TOTP).

The server 110 may then determine the location of the communication device 102 that originally broadcasted the beacon signal detected by the sever 110 via the beacon service 606. This is because, in some embodiments, the communication device 102 provides its location to the beacon service 606 when receiving a unique identifier. The server 110 may store the location, and later use the location to determine that the user device 108 is likely in close proximity to the location of the communication device 102 because the user device 108 detected the beacon signal transmitted by the communication device 102. For example, the beacon signal may be transmitted at a low power so that if a user device 108 detects the signal it is likely to be in close proximity to the communication device 102. In some embodiments, the server 110 may perform additional location verification procedures based on the optional location information provided by the user device 108 (e.g. GPS, SSID triangulation info, etc.).

The beacon service 606 may also (1) resolve the beacon payload content to a signal via the resolver API 609 or beacon resolver service; (2) provide configuration data to the beacon transmitter 115 on the communication device 102; or (3) provide a control API 610 to allow an engineer or operator 612 to change one or more settings programmatically. From a high-level point of view, the resolver API 609 may act as a bridge between the reported beacon (for example, from the user's mobile device 108 or the user's laptop 108B) and an event bus 602. To achieve that, in some instances, the resolver service exposes an internet facing API that any device (e.g., the communication device 102 or mobile devices 108 and 108B) can contact directly.

In some embodiments, the event bus 602 may store information related to particular events or actions taken by the communication device 102, user devices 108 and 108B, and/or the server 110, for example. Stored information may include data related to signals detected or transmitted, signals generated or processed, and other relevant events. The event bus 602 may be concurrently accessed by one or more services (not shown) to retrieve updates and information on relevant events stored in the event bus 602.

The beacon service 606 may also include a configuration API 608 and a resolver API 609. In some embodiments, the resolver API 609 may pass data to only the event bus 602 through the beacon service 606. In other embodiments, the resolver API 609 may pass data to additional components of the server 110. Also, in some embodiments, the resolver API 609 passes data though the beacon service 606 and the beacon service 606 may not store any data that is passed through. Alternatively, the beacon service 606 may store some or all data passed through in some embodiments.

The resolver API 609 may be a publicly exposed API through which all device requests pass (e.g. from a communications device 102 or user device 108 or 108B). The resolver API 609 may support more than one API in some embodiments. Also, the data store 604 may be configured to be or include a table that stores device information. In some embodiments, to limit risks around concurrent modifications of the table, only one type of configuration API 608 may be allowed to modify the table.

In some embodiments, a communication device 102 may store a secret key in memory to generate a TOTP. The secret key may be generated the first time that a device (e.g. a communications device 102 or user device 108 or 108B) contacts the beacon service. In some embodiments, the secret key may not change unless manually rotated by an operator 612 through a control API 610. The control API 610 may allow updating data that is stored in a device information table. The device information table may be used to store all the information used by the configuration API 608. For example, in some embodiments, a secret key may be set to the device serial number because this is what the device may provide when it requests configuration.

The beacon services related data in the data store 604 and event bus 602, and any other data on or passing through the server 110, may be accessible by services and systems described in FIGS. 2-5, for example. In some embodiments, all or a portion of the beacon services related data may be used in the determination of a confidence score 208 for authentication purposes, for example.

Figure 7:
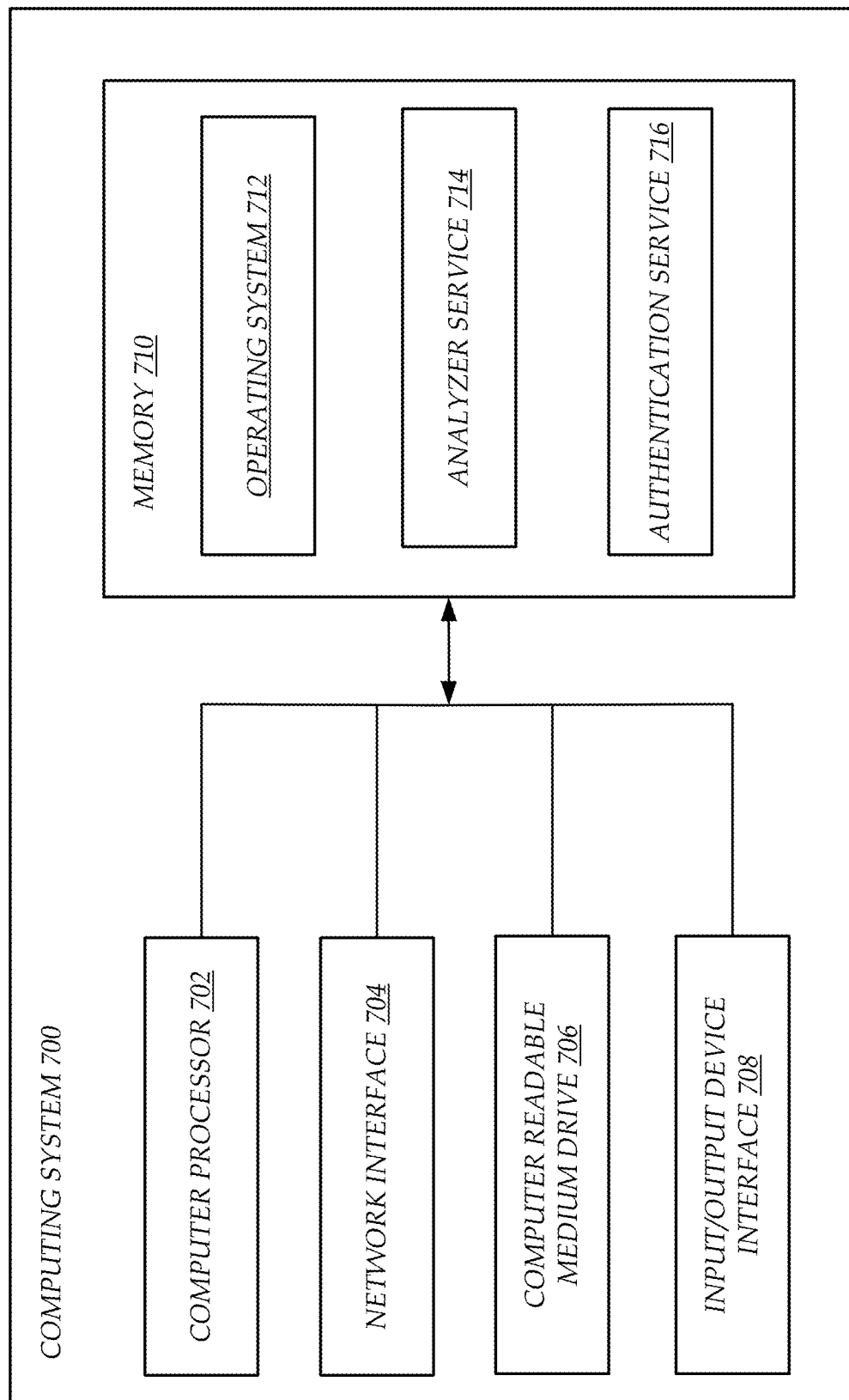
FIG. 7 is a block diagram of an illustrative computing system configured to provide information and services to a communication device according to some embodiments.

FIG. 7 is a block diagram of an illustrative server 110, or computing system 700, configured to provide information and analysis to the communication device 102, or to execute the processes and implement the features described herein. In some embodiments, the computing system 700 may include: one or more computer processors 702, such as physical central processing units ("CPUs"); one or more network interfaces 704, such as a network interface cards ("NICs"); one or more computer readable medium drives 706, such as high density disk drives ("HDDs"), solid state drives ("SDDs"), flash drives, and/or other persistent non-transitory computer-readable media, for example in a data store 118; an input/output device interface 708, such as an IO interface in communication with one or more external storage drives; and one or more computer readable memories 710, such as random access memory ("RAM") and/or other volatile non-transitory computer-readable media.

The network interface 704 can provide connectivity to one or more networks or computing systems, such as a communication device 102, another server 110, etc. The computer processor 702 can receive information and instructions from other computing systems or services via the network interface 704. The network interface 704 can also store data directly to the computer-readable memory 710. The computer processor 702 can communicate to and from the computer-readable memory 710, execute instructions and process data in the computer readable memory 710, etc.

The computer readable memory 710 may include computer program instructions that the computer processor 702 executes in order to implement one or more embodiments. The computer readable memory 710 can store an operating system 712 that provides computer program instructions for use by the computer processor 702 in the general administration and operation of the computing system 700. The computer readable memory 710 can further include computer program instructions and other information for implementing aspects of the present disclosure. For example, in one embodiment, the computer-readable memory 710 may include an analyzer service 714 that, for example, includes instructions for analyzing various inputs, such as user audio data 201. As another example, the computer-readable memory 710 may also or alternatively include an authentication service 716 used to confirm within a degree of tolerance that a particular user is who she says she is. The authentication service 716 may consider a confidence score, which may be based on a set of inputs provided to the computing system 700 and, in some embodiments, an analysis of data stored in the computer readable medium drive 706.

In some embodiments, multiple computing systems 700 may communicate with each other via their respective network interfaces 704, and can implement data storage or streaming authentication independently (e.g., each computing system 700 may execute one or more separate instances of the process 200), in parallel (e.g., each computing system 700 may execute a portion of a single instance of a process 200), etc. For example, a distributed computing environment may provide hosted capabilities for implementing the systems and methods described herein.

Figure 8:
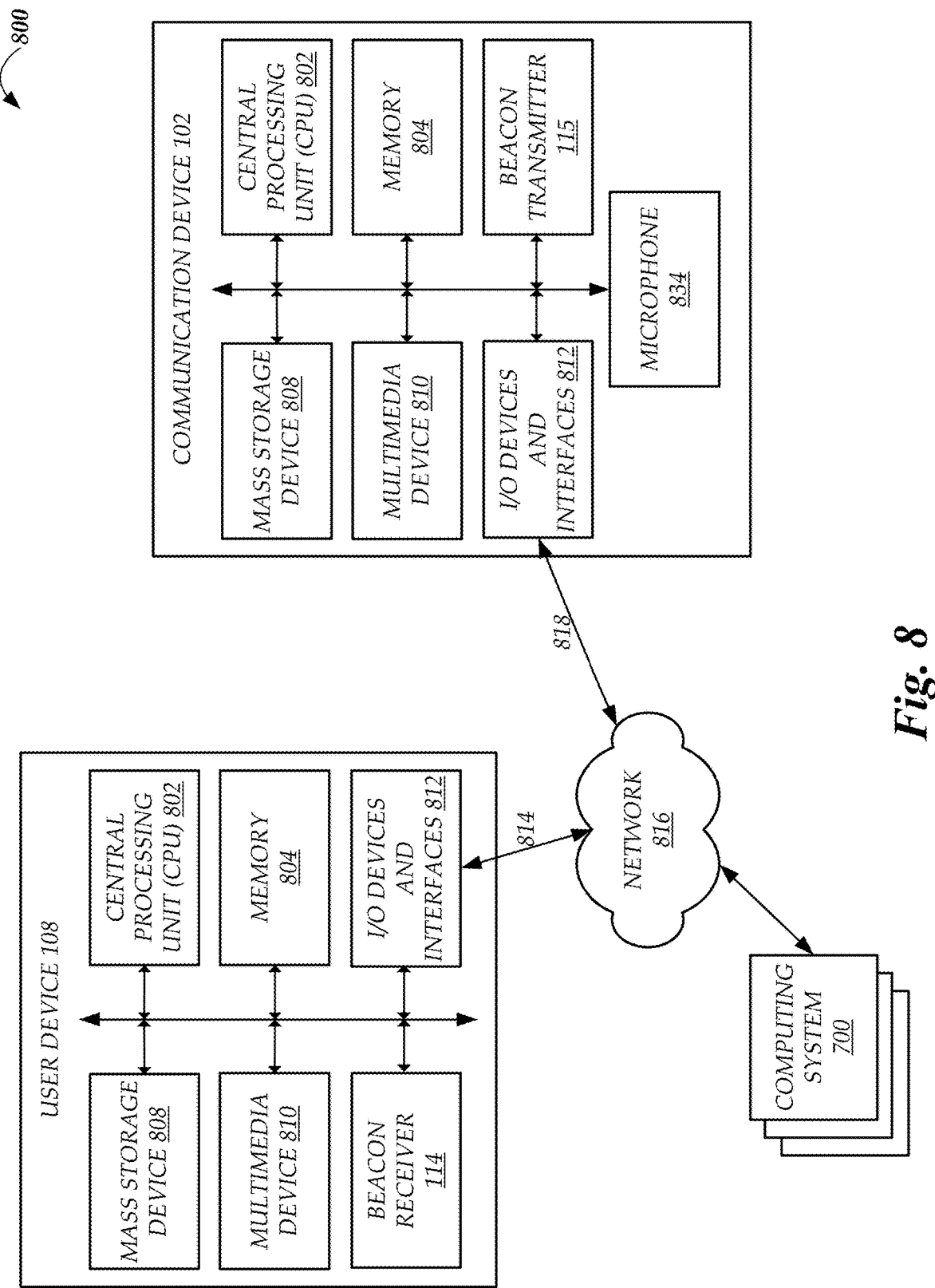
FIG. 8 is a block diagram of an illustrative user device and an illustrative communication device configured to communicate with each other and a computing system through a network according to some embodiments.

FIG. 8 is a block diagram of an illustrative system 800 including a user device 108 and an illustrative communication device 102 configured to communicate with each other and a server 110 (which may also be computing system 700 in FIG. 7, for example), through a network to implement instructions for creating a confidence score and authenticating a user based on various inputs.

The computing system 700, user devices 108, and/or communication devices 102 may be used to implement one or more of the systems and methods described herein. In addition, in one embodiment, the system 800 may be configured to manage access or administer a software application. While FIG. 8 illustrates one embodiment of a system 800, it is recognized that the functionality provided for in the components and modules of the various devices in the system 800 may be combined into fewer components and modules or further separated into additional components and modules.

In the embodiment of FIG. 8, the computing system 700 is coupled to a network 816, such as a LAN, WAN, or the Internet, for example, via a wired, wireless, or combination of wired and wireless, communication link 814 and 818. The network 816 communicates with various computing devices and/or other electronic devices via wired or wireless communication links. In the embodiment of FIG. 8, the network 816 is communicating with one or more computing systems 700, one or more user devices 108, and/or one or more communication devices 102.

The beacon receiver 114 or beacon transmitter 115 may implement a Bluetooth® low energy protocol as described above. In addition, the beacon devices 114 and 115 may be implemented to communicate with input devices 812 and may also comprise software which allows access to data through the use of one or more APIs. In some embodiments, a beacon transmitter 115 may be in the user device 108 instead of, or in addition to, a beacon receiver 114. Also, in some embodiments a beacon receiver 114 may be in the communication device 102 instead of, or in addition to, a beach transmitter 115.

The input device(s) 812 may comprise a keyboard, roller ball, pen and stylus, mouse, trackball, camera, voice recognition system, microphone, or pre-designated switches or buttons. The output device(s) may comprise a speaker, a display screen, a printer, or a voice synthesizer. In addition, a touch screen may act as a hybrid input/output device. The microphone 834 in the communication device 102 may be configured to detect audio instructions and/or commands.

In an embodiment, a user device 108 comprises a personal computer, a laptop computer, a tablet computer, an e-reader device, a cellular phone, a smartphone, a GPS system, a gaming device, a portable computing device, a server, a computer workstation, a local area network of individual computers, an interactive kiosk, a personal digital assistant, an interactive wireless communications device, a handheld computer, an embedded computing device, an audio player, or the like.

In addition to the computing systems 700 and communication devices 102 that are illustrated in FIG. 8, the network 816 may communicate with other data sources or other computing devices. The system configuration 800 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

In one embodiment, the computing system 700 comprises a mainframe computer suitable for controlling and/or communicating with large databases, performing high volume transaction processing, and generating reports from large databases. The computing system 700 may also include a central processing unit ("CPU") 802, which may comprise a conventional microprocessor. The computing system 700 may also include a memory 804, such as random access memory ("RAM") for temporary storage of information and/or a read only memory ("ROM") for permanent storage of information, and a mass storage device 808, such as a hard drive, diskette, or optical media storage device.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM, flash memory, ROM, EPROM, EEPROM, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

Further, while the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a microphone;
   a beacon transmitter; and
   one or more computer processors in communication with the beacon transmitter and the microphone, wherein the one or more computer processors are configured to at least:
     transmit, via the beacon transmitter, a beacon signal comprising source identification data representing a first device identifier associated with the beacon transmitter;
     receive, from a user device, user device data comprising:
       detected beacon data representing the first device identifier; and
       receiver identification data representing a second device identifier associated with the user device;
     analyze the user device data to determine the first device identifier associated with the beacon transmitter;
     determine a location of the beacon transmitter based on the first device identifier;
     generate first location data, representing a location of the user device, based on the location of the beacon transmitter;
     determine a user associated with the user device based on the second device identifier;
     receive, via the microphone, audio data representing an utterance of the user;
     calculate a first confidence score, representing a confidence that the utterance was made by the user, using the audio data and a voice model trained using a voice of the user;
     determine that the utterance was likely made by the user based on the first confidence score;
     generate second location data, representing a location at which the utterance was made, based on a location of the microphone;
     calculate a second confidence score, representing a confidence that the user is at a particular location, using a model trained to calculate the second confidence score based on the first location data representing the location of the user device and the second location data representing the location at which the utterance was made;
     determine that the user is at the particular location based on the second confidence score; and
     execute a command in response to the utterance based on the determination that the user is at the particular location.

2. The system of claim 1, further comprising a camera; wherein the one or more computer processors are further configured to at least:
   receive image data generated by the camera, wherein the image data represents a facial feature of the user;
   calculate a third confidence score, representing a confidence that the facial feature is associated with the user, using the image data and a facial feature detection model associated with the user;
   determine that the facial feature is likely a facial feature of the user based on the third confidence score; and
   generate third location data, representing a location at which the facial feature was imaged, based on a location of the camera, wherein the second confidence score is calculated using the third location data.

3. The system of claim 1, wherein the one or more computer processors are further configured to at least:
   determine a security level associated with requested data, wherein the utterance comprises a request to access the requested data;
   determine that the user is associated with the security level; and
   provide access to the requested data based on the determination that the user is associated with the security level, and the determination that the user is at the particular location.

4. The system of claim 1, wherein the model comprises a neural network model, a conditional random field model, a logic network model, or a random forest model.

5. A computer-implemented method comprising:
   under control of a computing system comprising one or more computer processors configured to execute specific instructions,
     receiving, from a user device associated with a user, detected beacon data representing a beacon signal detected by the user device, wherein the detected beacon data comprises a first device identifier of a source of the beacon signal;
     generating first location data, representing a location of the user device, based on a predetermined location of the source of the beacon signal;
     receiving, from a communication device, audio data representing a user utterance;
     determining, using the audio data and a voice model trained using a voice of the user, that the utterance was likely made by the user;
     generating second location data, representing a location at which the utterance was made, based on a location of the communication device; and calculating a confidence score, representing a confidence that the user is at a particular location, based on the first location data and on the second location data.

6. The computer-implemented method of claim 5, further comprising:
determining that the user is at the particular location based on the confidence score;
determining that the utterance comprises a command to begin a meeting associated with the user; and
initiating a meeting procedure associated with the meeting.

7. The computer-implemented method of claim 5, further comprising:
determining a security level associated with requested data, wherein the utterance comprises a request to access the requested data;
determining that the user is associated with the security level;
determining that the user is at the particular location based on the confidence score; and
providing access to the requested data based on determining that the user is associated with the security level and determining that the user is at the particular location.

8. The computer-implemented method of claim 5, further comprising:
determining that the confidence score does not satisfy a criterion for determining that the user is at the particular location;
generating a prompt for verification information;
receiving a response to the prompt; and
generating a modified confidence score based on the confidence score and the response to the prompt.

9. The computer-implemented method of claim 5, further comprising:
generating device identifier data representing the first device identifier, wherein the first device identifier is associated with a beacon signal transmitter, and wherein the beacon signal transmitter is the source of the beacon signal; and
storing beacon transmitter location data in a data store, wherein the beacon transmitter location data is stored with the device identifier data.

10. The computer-implemented method of claim 9, further comprising causing the beacon signal transmitter to transmit the beacon signal, wherein the beacon signal transmitter is part of the computing system.

11. The computer-implemented method of claim 9, further comprising accessing the beacon transmitter location data from a data store using the first device identifier subsequent to receiving the detected beacon data.

12. The computer-implemented method of claim 5, further comprising, prior to receiving the audio data:
determining to obtain the voice model associated with the user based on the location of the user device; and
obtaining the voice model associated with the user.

13. The computer-implemented method of claim 12, further comprising:
receiving, from a second user device associated with a second user, second detected beacon data representing a beacon signal detected by the second user device, wherein the second detected beacon data comprises the first device identifier;
determining to obtain a second voice model associated with the second user based on the location of the second user device; and
obtaining the second voice model, wherein the voice model and the second voice model are obtained independently of receiving audio data representing an utterance by the user or the second user.

14. The computer-implemented method of claim 5, wherein the calculating the confidence score comprises using a model trained to calculate the confidence score based on the first location data, representing a location of the user device, and on the second location data, representing a location at which the utterance was made.

15. A system comprising:
computer-readable memory storing executable instructions; and
one or more processors in communication with the computer-readable memory and configured by the executable instructions to at least:
receive, from a computing device, detected beacon data representing a beacon signal detected by the computing device, wherein the detected beacon data comprises a first device identifier of a user device associated with a user, and wherein the user device is a source of the beacon signal;
generate first location data, representing a location of the user device, based on location data associated with the beacon signal;
receive, from a communication device, audio data representing a user utterance;
determine, using the audio data and a voice model trained using a voice of the user, that the utterance was likely made by the user;
generate second location data, representing a location at which the utterance was made, based on a location of the communication device; and
calculate a confidence score, representing a confidence that the user is at a particular location, based on the first location data and on the second location data.

16. The system of claim 15, wherein the one or more processors are further configured by the executable instructions to at least:
determine that the user is at the particular location based on the confidence score;
determine that the utterance comprises a command to begin a meeting associated with the user; and
initiate a meeting procedure associated with the meeting.

17. The system of claim 15, wherein the one or more processors are further configured by the executable instructions to at least:
determine a security level associated with requested data, wherein the utterance comprises a request to access the requested data;
determine that the user is associated with the security level;
determine that the user is at the particular location based on the confidence score; and
provide access to the requested data based on determining that the user is associated with the security level and determining that the user is at the particular location.

18. The system of claim 15, wherein the one or more processors are further configured by the executable instructions to at least:
determine that the confidence score does not satisfy a criterion for determining that the user is at the particular location;
generate a prompt for verification information;
receive a response to the prompt; and
generate a modified confidence score based on the confidence score and the response to the prompt.

19. The system of claim 15, wherein the one or more processors are further configured by the executable instructions to at least:
- generate device identifier data representing the first device identifier, wherein the first device identifier is associated with a beacon signal transmitter, and wherein the beacon signal transmitter is the source of the beacon signal; and
- store beacon transmitter location data in a data store, wherein the beacon transmitter location data is stored with the device identifier data.

20. The system of claim 15, wherein the one or more processors are further configured by the executable instructions to at least obtain a plurality of voice models prior to receiving the audio data representing the user utterance, wherein individual voice models of the plurality of voice models are associated with individual users of a plurality of users, and wherein the plurality of voices models comprises the voice model trained using the voice of the user.

* * * * *